(12) United States Patent
Craske

(10) Patent No.: US 11,379,237 B2
(45) Date of Patent: Jul. 5, 2022

(54) VARIABLE-LENGTH-INSTRUCTION PROCESSING MODES

(71) Applicant: ARM LIMITED, Cambridge (GB)

(72) Inventor: Simon John Craske, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 15/572,678

(22) PCT Filed: Apr. 7, 2016

(86) PCT No.: PCT/GB2016/050978
§ 371 (c)(1),
(2) Date: Nov. 8, 2017

(87) PCT Pub. No.: WO2016/193655
PCT Pub. Date: Dec. 8, 2016

(65) Prior Publication Data
US 2018/0157490 A1 Jun. 7, 2018

(30) Foreign Application Priority Data
Jun. 5, 2015 (GB) ................................. 1509746

(51) Int. Cl.
*G06F 9/30* (2018.01)
*G06F 9/38* (2018.01)
(Continued)

(52) U.S. Cl.
CPC ........ *G06F 9/30149* (2013.01); *G06F 1/3296* (2013.01); *G06F 9/3001* (2013.01);
(Continued)

(58) Field of Classification Search
CPC .................................................. G06F 9/30149
See application file for complete search history.

(56) References Cited

U.S. PATENT DOCUMENTS 5,638,525 A * 6/1997 Hammond .......... G06F 9/30043
712/209
6,035,315 A 3/2000 Krick
(Continued)

FOREIGN PATENT DOCUMENTS

| CN | 1430124 A | 7/2003 |
| CN | 101105711 | 1/2008 |

(Continued)

OTHER PUBLICATIONS

International Search Report and Written Opinion of the ISA for PCT/GB2016/050978, dated Jul. 6, 2016, 19 pages.
(Continued)

*Primary Examiner* — John M Lindlof
(74) *Attorney, Agent, or Firm* — Nixon & Vanderhye, PC

(57) ABSTRACT

A data processing apparatus (2) operates in a first mode of operation having a first set of processing circuitry (8, 12, 18, 20, 22) ready to perform processing operations and in a second mode of operation having a second set of processing circuitry (8, 12, 14, 18, 20, 22, 24) ready to perform processing operations. A first proper subset (32) of program instructions within the instruction set supported are processed by the processor using a selectable one of the first mode and the second mode. A second proper subset (34) of program instructions within the instruction set are required to be processed by the processor operating in the second mode. Processing circuitry (14, 24) which is inactive in a mode of operation may be placed into a low power state.

20 Claims, 5 Drawing Sheets

(51) Int. Cl.
*G06F 11/34* (2006.01)
*G06F 1/3296* (2019.01)
*G06F 11/30* (2006.01)

(52) U.S. Cl.
CPC ...... *G06F 9/30076* (2013.01); *G06F 9/30112* (2013.01); *G06F 9/30189* (2013.01); *G06F 9/3802* (2013.01); *G06F 9/3814* (2013.01); *G06F 9/3822* (2013.01); *G06F 11/3024* (2013.01); *G06F 11/3409* (2013.01); *G06F 11/3466* (2013.01)

(56) References Cited

U.S. PATENT DOCUMENTS

| | | | |
|---|---|---|---|
| 6,189,090 | B1 | 2/2001 | Tan et al. |
| 6,496,919 | B1 | 12/2002 | Nishimoto et al. |
| 6,976,182 | B1* | 12/2005 | Filippo ................ G06F 1/3203 713/324 |
| 8,806,228 | B2 | 8/2014 | Gee |
| 9,092,215 | B2 | 7/2015 | Grisenthwaite |
| 9,317,301 | B2 | 4/2016 | Henry |
| 2001/0044891 | A1* | 11/2001 | McGrath ............ G06F 9/30036 712/229 |
| 2002/0040429 | A1 | 4/2002 | Dowling |
| 2002/0174319 | A1 | 11/2002 | Rivers et al. |
| 2005/0044434 | A1* | 2/2005 | Kahle ................ G06F 1/3203 713/320 |
| 2006/0107076 | A1* | 5/2006 | Duncan .............. G06F 1/3228 713/300 |
| 2007/0079150 | A1 | 4/2007 | Belmont et al. |
| 2007/0226462 | A1* | 9/2007 | Scott ................ G06F 9/30149 712/207 |
| 2008/0126743 | A1 | 5/2008 | Jusufovic |
| 2010/0185833 | A1 | 7/2010 | Saito et al. |
| 2011/0271126 | A1 | 11/2011 | Hill |
| 2012/0233477 | A1 | 9/2012 | Wu et al. |
| 2013/0145126 | A1 | 6/2013 | Harris |
| 2014/0019723 | A1 | 1/2014 | Yamada et al. |
| 2014/0258685 | A1 | 9/2014 | Makineni et al. |
| 2014/0298060 | A1 | 10/2014 | Hooker et al. |
| 2015/0074488 | A1* | 3/2015 | Pream ................ G06F 11/108 714/759 |

FOREIGN PATENT DOCUMENTS

| | | |
|---|---|---|
| CN | 101101544 A | 3/2008 |
| CN | 101256504 A | 9/2008 |
| CN | 101876892 A | 11/2010 |
| CN | 102707926 | 10/2012 |
| CN | 103098020 | 5/2013 |
| EP | 1 050 796 | 11/2000 |
| WO | WO 2007/109395 | 9/2007 |

OTHER PUBLICATIONS

Search and Examination Report for GB 1509746.2, dated Dec. 15, 2015, 8 pages.
Office Action from Chinese National Phase for Application 201680030360.3, dated Apr. 21, 2021, 18 pages.
Office Action from Chinese National Phase for Application 201680030360.3, dated Nov. 8, 2021, 23 pages.
Office Action (Notice of Allowance) from National Intellectual Property Administration China, for Application No. 201680030360.3 dated Apr. 25, 2022, 9 pages.

* cited by examiner 16-bit instruction : Switch to $2^{nd}$ Mode 32-bit instruction : Switch to $1^{st}$ Mode

VARIABLE-LENGTH-INSTRUCTION PROCESSING MODES

This application is the U.S. national phase of International Application No. PCT/GB2016/050978 filed 7 Apr. 2016, which designated the U.S. and claims priority to GB Patent Application No. 1509746.2 filed 5 Jun. 2015, the entire contents of each of which are hereby incorporated by reference.

This disclosure relates to data processing systems. More particularly, this disclosure relates to modal control of hardware to support the execution of program instructions.

It is known to provide data processing systems supporting multiple instruction sets. For example, processing systems as designed by ARM Limited of Cambridge, England may support both the ARM and Thumb instruction sets.

Viewed from one aspect the present disclosure provides apparatus for processing data comprising:

a processor to perform processing operations upon operands stored within a register file of said processor and as specified by program instructions of an instruction set, said processor operating in at least a first mode of operation having a first set of active processing circuitry ready to perform processing operations and a second mode of operation having a second set of active processing circuitry ready to perform processing operations, said second set of active processing circuitry different from said first set of active processing circuitry; wherein a first proper subset of program instructions within said instruction set are processed by said processor operating in a selectable one of said first mode and said second mode; and a second proper subset of program instructions within said instruction set are required to be processed by said processor operating in said second mode.

Viewed from another aspect the present disclosure provides apparatus for processing data comprising:

processing means for performing processing operations upon operands stored within a register file of said processor means and as specified by program instructions of an instruction set, said processing means operating in at least a first mode of operation having a first set of active processing means for performing processing operations and a second mode of operation having a second set of active processing means for performing processing operations, said second set of active processing means different from said first set of active processing means; wherein a first proper subset of program instructions within said instruction set are processed by said processing means operating in a selectable one of said first mode and said second mode; and a second proper subset of program instructions within said instruction set require to be processed by said processing means operating in said second mode.

Viewed from a further aspect the present disclosure provides a method of processing data comprising:

performing processing operations upon operands stored within a register file of a processor and as specified by program instructions of an instruction set using at least a first mode of operation having a first set of active processing circuitry for performing processing operations and a second mode of operation having a second set of active processing circuitry for performing processing operations, said second set of active processing circuitry different from said first set of active processing circuitry; wherein a first proper subset of program instructions within said instruction set are processed using a selectable one of said first mode and said second mode; and a second proper subset of program instructions within said instruction set require to be processed using said second mode.

Embodiments may now be described, by way of example only, with reference to the accompanying drawings in which:

FIG. 1 schematically illustrates a data processing apparatus having a first mode of operation and a second mode of operation;

FIG. 2 schematically illustrates an instruction set including a first proper subset of program instructions and a second proper subset of program instructions;

FIG. 3 schematically illustrates different forms of mode switching instruction;

Figure 1:
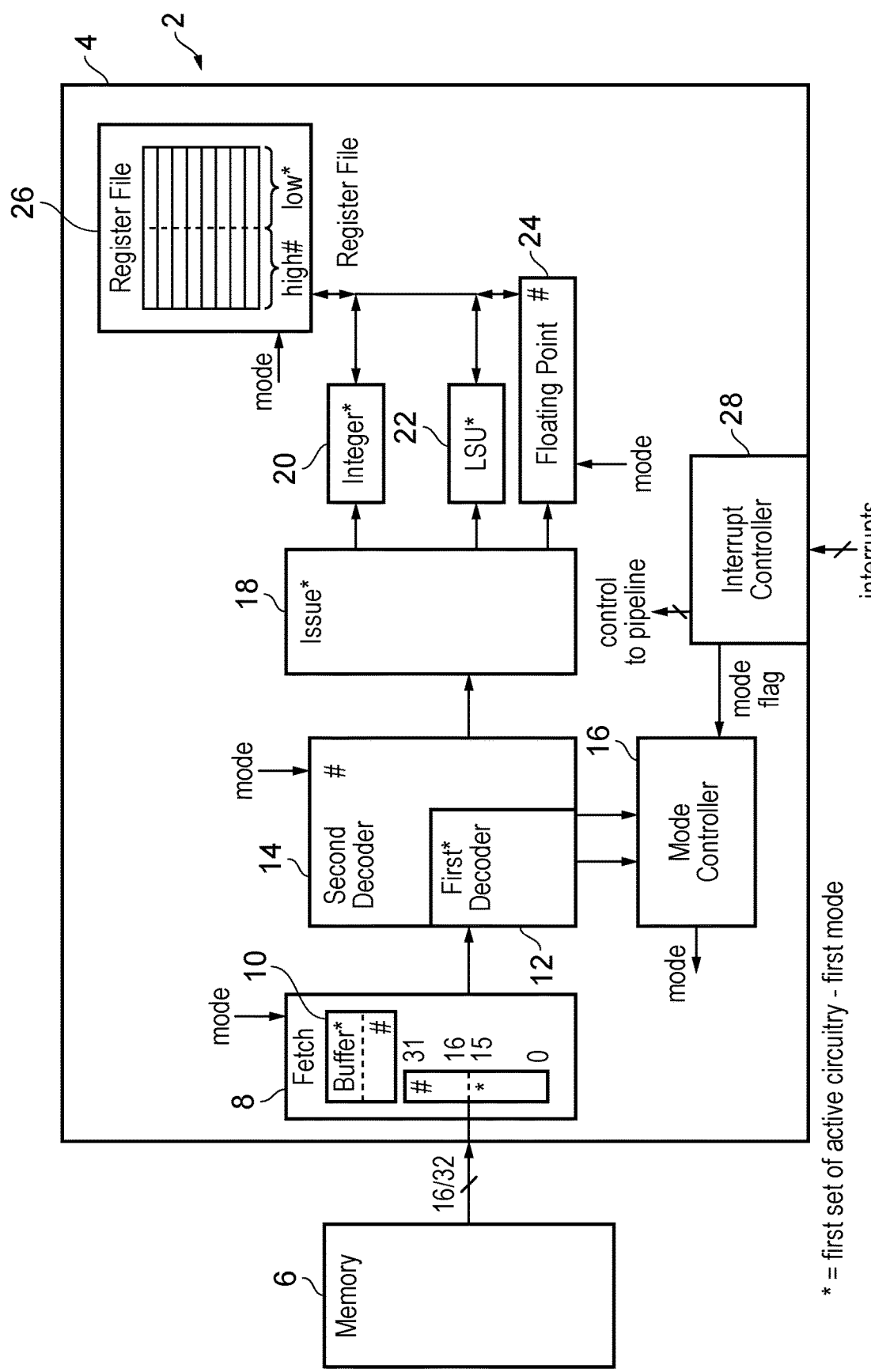

FIG. 1 schematically illustrates a data processing apparatus 2 comprising a processor 4 coupled to a memory 6. The processor 4 includes fetch circuitry 8 for fetching program instructions for execution from the memory 6. The fetch circuitry 8 is controlled by a mode signal to operate in either a first mode of operation or a second mode of operation. In the first mode of operation, the fetch circuitry 8 serves as first fetch circuitry to fetch program instructions from the memory 6 at a first fetch rate. In the second mode, the fetch circuitry 8 serves as second fetch circuitry to fetch program instructions from a memory 6 at a second fetch rate. The fetch circuitry 8 includes an instruction fetch buffer 10 into which program instructions fetched by the fetch circuitry are stored. In the first mode, only a portion of the instruction fetch buffer 10 is used (clocked and/or powered) and this serves as a first instruction fetch buffer. In the second mode, the whole of the instruction fetch buffer 10 is used and this serves as a second instruction fetch buffer. The first instruction fetch buffer has a lower storage capacity than the second instruction fetch buffer.

The program instructions fetched from the memory 6 may be 16-bit instructions or 32-bit instructions. More generally, the instructions may be N-bit instructions or M-bit instructions, where M is greater than N. In this example embodiment in the first mode the fetch bit width is 16-bits and in the second mode the fetch bit width is 32-bits. If the processing apparatus 2 consumes on average one instruction per cycle, then operating in the first mode, the fetch circuitry 8 is able to fetch one 16-bit program instruction bit each cycle and so keep pace with program execution if predominantly 16-bit program instructions are being executed. Conversely, in the second mode, the fetch circuitry 8 is able to fetch one 32-bit program instruction each cycle and so keep pace with program execution if executing predominantly 32-bit program instructions. It will be appreciated that in practice a mix of 16-bit and 32-bit program instructions may be executed and furthermore the number of program instructions executed each cycle may not be one. When using a 16-bit fetch bit width, it is still possible to fetch 32-bit instructions, but in this case two fetch cycles will be used to fetch each instruction.

The instruction fetch buffer 10 provides smoothing between the instruction fetch rate and the instruction consumption rate. Energy consumption can be reduced if the instruction fetch rate capability is matched to the instruction consumption rate. In the example of FIG. 1, if the processor 4 is executing predominately 16-bit instructions, then energy may be saved by only fetching on average 16-bits of instruction per cycle permitting portions of the fetch circuitry 8 to be powered down, or at least be clock gated, during such operation (first mode of operation). Conversely, should the processor 4 need to perform a sustained period of execution of 32-bit program instructions, then the second mode of operation of the fetch circuitry 8 may be adopted in order to support a sustained fetch rate of 32-bits per cycle. Efficiency may be improved in embodiments in which the instruction fetch rate capability of the fetch circuitry is mapped to the instruction consumption rate of the processor 4. Providing an excess instruction fetch rate capability can unnecessarily consume energy.

It will be appreciated that in the above it was assumed that the fetch cycles corresponded to instruction execution cycles. In other embodiments, this may not necessarily by the case. Nevertheless, in such other embodiments it may still be appropriate to operate the fetch circuitry in a plurality of modes with different fetch rate capabilities. In a system supporting a mixed 16-bit and 32-bit instruction set, then the 16-bit instructions may be a first proper subset of program instructions within the instruction set and, with respect to the behaviour of the fetch circuitry 8, the processor 4 may operate in a selectable one of a first mode supporting a 16-bit instruction fetch width or a 32-bit instruction fetch width. The fetch circuitry 8 will have an excess fetch capability when operating in the second mode and fetching only 16-bit program instructions, but nevertheless may operate correctly. However, when executing a sustained stream of 32-bit program instructions, then the fetch circuitry 8, (despite the action of the instruction fetch buffer 10) may be unable to keep pace with instruction consumption if operating in the first mode (16-bit fetch width) and accordingly processor 4 may stall awaiting program instructions to be fetched. Accordingly, the 32-bit program instructions of the instruction set may be considered to be a second proper subset of program instructions that require to be processed by the processor 4 in the second mode (at least if undesired stalls want to be avoided).

The program instructions fetched by the fetch circuitry 8 are supplied to decoder circuitry formed of first decoder circuitry 12 and second decoder circuitry 14. The first decoder circuitry 12 is active in the first mode. Both the first decoder circuitry 12 and the second decoder circuitry 14 are active in the second mode. When the processor 4 is only executing 16-bit program instructions, then it may operate in the first mode in which only the first decoder circuitry 12 is active. The first decoder circuitry 12 is able to decode 16-bit program instructions, but is unable to decode all 32-bit program instructions. When operating in the second mode, both the first decoder circuitry 12 and the second decoder circuitry 14 are active and all instructions within the instruction set may be decoded. A second proper subset of program instructions (e.g. some 32-bit program instructions, such as floating point program instructions) require the second decoder circuitry 14 to be active as the first decoder circuitry 12 is not able to decode program instructions from this second subset of program instructions.

In respect of the fetch circuitry 8, the first and second decoder circuitry 12, 14 and other elements of the processor 4 illustrated in FIG. 1, when portions of the circuitry are inactive, they may be placed into a low power state. This low power state may take various forms, such as clock signal gating, powering down a relevant power domain containing the inactive circuit elements or other power control techniques.

Mode control circuitry 16 is coupled to the first decoder 12 and the second decoder 14 and serves to snoop program instructions that are decoded for execution. The mode control circuitry 16 uses this snooped data to heuristically control switching between the first mode and the second mode in dependence upon detected characteristics of the stream of program instructions executed. If a program instruction is decoded which requires the processor to operate in a second mode, then the mode control circuitry 16 switches operation to this second mode. If greater than a threshold rate of program instructions which are preferentially, but not essentially, executed in the second mode are detected, then a switch may be made to the second mode. Similarly, if greater than a threshold rate of program instruction execution of program instructions of the first proper subset which are preferentially (for example for at least reduced energy consumption reasons) executed within the first mode are detected, then a switch to that first mode may be made.

Decoded control signals generated by the first decoder 12 and the second decoder 14 are passed to issue circuitry 18 where corresponding processing operations are issued in to an appropriate one of a number of processing pipelines, such as an integer pipeline 20, a load store unit 22 and a floating point pipeline 24. In this example, the floating point pipeline 24 is responsible for executing floating point program instructions. The floating point program instructions are 32-bit program instructions which are part of the second proper subset of program instructions and require the processor 4 to be operating in the second mode. Accordingly, the floating point pipeline 24 is switched between an inactive state in the first mode and an active state in the second mode. The inactive state is a low power state. In practice, it may be that large portions of program code are executed that do not require floating point program instruction execution and accordingly the floating point pipeline 24 may be powered down in accordance with the first mode of operation during such periods of program execution. Program instructions within the first subset of program instructions (which do not include any floating point instructions) may be executed irrespective of whether the floating point pipeline 24 is or is not active. A lower power consumption will be achieved if the floating point pipeline 24 is inactive.

A register file 26 is provided within the processor 4 to store operand values to be manipulated. The registers within the register file 26 include high order register file circuitry and low order register file circuitry. When operating in the second mode, both the high order register file circuitry and the low order register file circuitry are active and available for use. When operating in the first mode, the high order register file circuitry is placed into a low power state in which it is unavailable for use while the low order register file circuitry remains active and available for use. First proper subset of program instructions requires access to the low order register file circuitry, but not to the high order register file circuitry. Conversely, the second proper subset of program instructions requires access to the high order register file circuitry and the low order register file circuitry.

The mode control circuitry 16 as discussed above is able to switch between the first mode of operation and the second mode of operation heuristically dependent upon detected characteristics of the stream of program instructions executed. Other switch mechanisms are also possible. For example, explicit mode switching program instructions may be provided within the instruction set. A specific 16-bit program instruction for switching from the first mode to the second mode may be included within the first proper subset of program instructions. A 32-bit mode switch instruction for switching from the second mode to the first mode may be included within the second proper subset of program instructions. The first decoder 12 may respond to the 16-bit mode switching program instruction to trigger the mode control circuitry 16 to switch the mode of operation from the first mode to the second mode. The second decoder 14 may respond to the 32-bit mode switching instruction to trigger the mode control circuitry 16 to switch from the second mode to the first mode.

Another form of mode switching control which may be performed is associated with interrupt signals received by an interrupt controller 28. When an interrupt is received, then a redirection of program instruction execution flow is triggered, as will be familiar to those in this technical field. The interrupt controller 28 is configured with data associated with each received interrupt signal indicating which interrupt handler program routine should be initiated when that interrupt is executed. This interrupt configuration data may also include mode data indicating which one of the first mode of operation or the second mode of operation is to be adopted for execution of the associated interrupt handler program. Thus, when an interrupt signal is received by the interrupt controller 28, execution of an associated interrupt handler program is initiated and a switch of mode of operation is made if the mode flag associated with that interrupt handler program indicates a different mode of processing to the currently operative mode of processing of the processor 4.

Figures 2, 3:
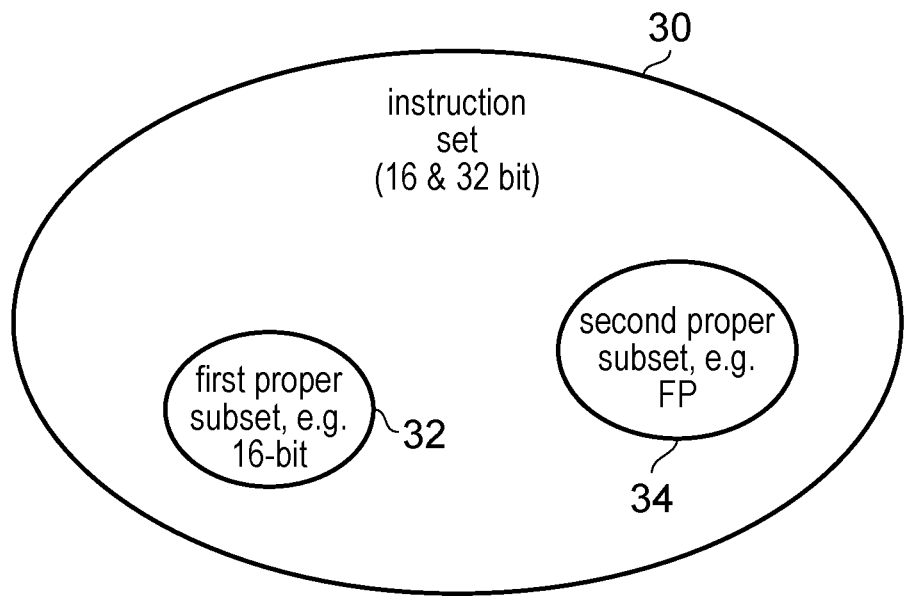

FIG. 2 schematically illustrates an instruction set 30 formed of a mixture of 16-bit program instructions and 32-bit program instructions. A first proper subset of program instructions 32 are instructions which may be processed in a selectable one of either the first mode of operation or the second mode of operation. A second proper subset of program instructions 34 are program instructions, such as floating point program instructions, which require to be processed in the second mode of operation. Program instructions outside of the first proper subset and the second proper subset may be executed in either the first mode of operation or the second mode of operation, but have a preference for execution in the second mode of operation.

FIG. 3 schematically illustrates the use of explicit mode switching program instructions within the instruction set 30. As previously discussed, a 16-bit instruction for execution when operating in the first mode of operation may be provided to switch execution to the second mode of operation. Similarly, an explicit 32-bit mode switching program instruction may be provided for execution in the second mode of operation to switch execution to the first mode of operation.

In other example embodiments instead of 16-bit instructions and 32-bit instructions, the system may operate with 32-bit instructions and 64-bit instructions.

Figure 4:
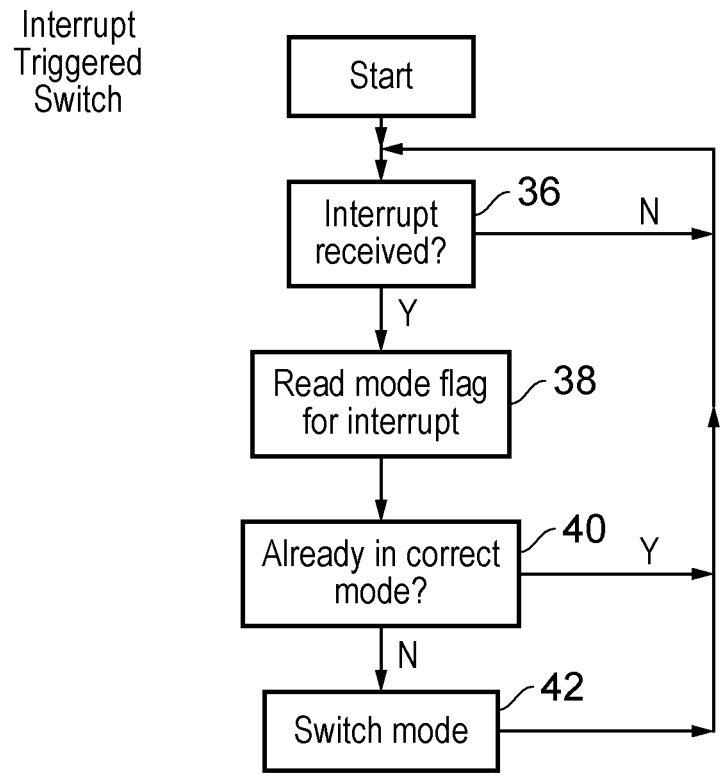
FIG. 4 is a flow diagram schematically illustrating switching between modes triggered by an interrupt.

FIG. 4 schematically illustrates an interrupt triggered switch of mode. At step 36 processing waits until an interrupt signal is received by the interrupt controller 28. At step 38, in addition to the other processing operations associated with an interrupt, the interrupt controller 38 serves to read the mode flag associated with the received interrupt. This mode flag is supplied to the mode controller 16. At step 40 the mode controller 16 determines from the received mode flag whether the processor 4 is operating in the correct mode as indicated by the mode flag for the newly adopted interrupt handling program. If the processor 4 is not currently operating in the correct mode, then step 42 serves to switch the mode of operation.

Figure 5:
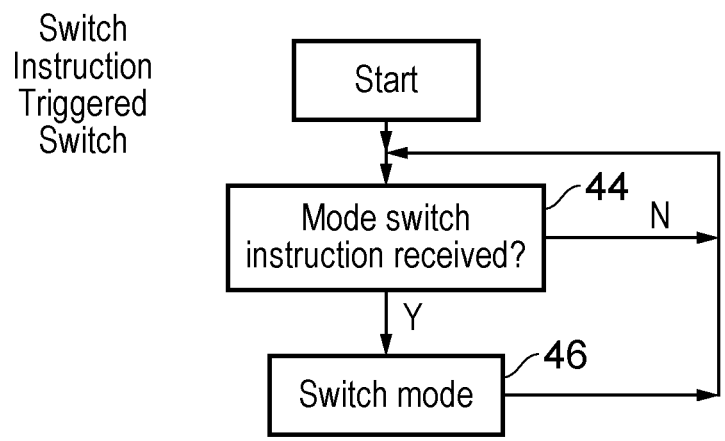
FIG. 5 is a flow diagram schematically illustrating switching between modes triggered by a switch instruction.

FIG. 5 is a flow diagram schematically illustrating explicit switch instruction triggered mode switching. The mode switching instructions may be either the 16-bit mode switching instruction or the 32-mode switching instruction referred to in relation to FIG. 3. At step 44 the instruction decoder circuitry 12, 14 waits until a mode switching instruction is received. When a mode switching instruction is received, then a signal is sent to the mode controller 16 to indicate that a mode switch should be performed. Step 46 corresponds to the mode controller 16 switching the mode as indicated by the explicit mode switching program instruction that has been executed.

Figure 6:
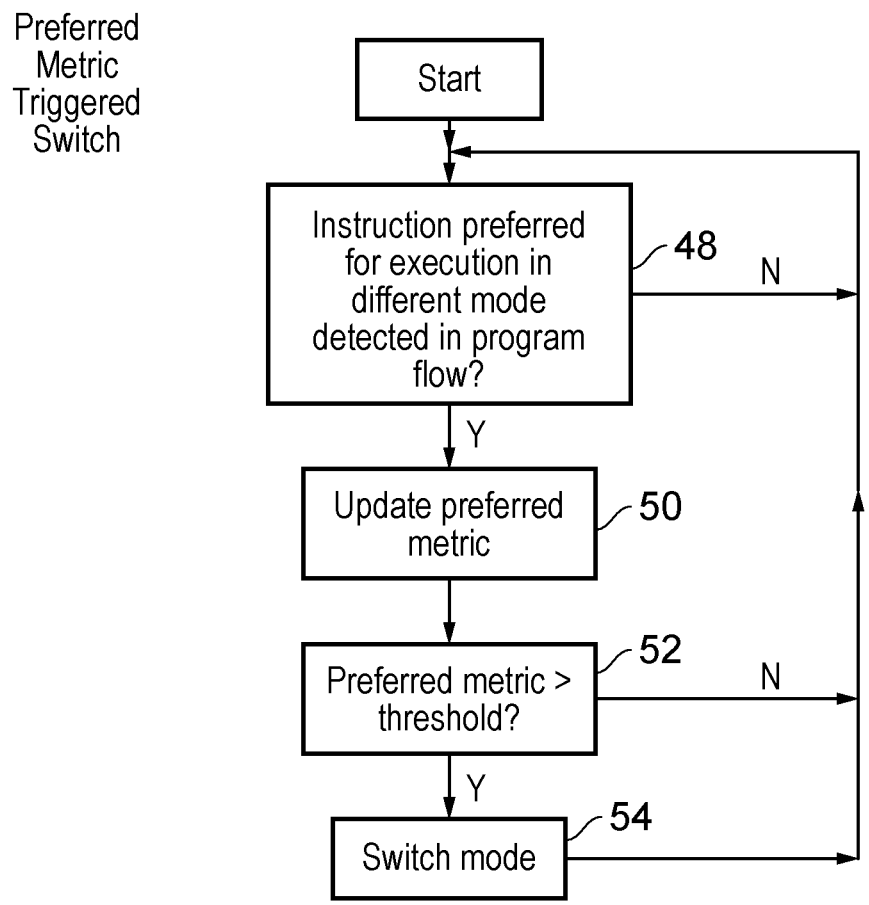
FIG. 6 is a flow diagram schematically illustrating switching between modes triggered by a preferred metric value.

FIG. 6 is a flow diagram schematically illustrating heuristic switching in accordance with a preferred execution metric. At step 48 processing waits until an instruction is decoded by the decoder circuitry 12, 14 which is detected by the mode controller 16 as an instruction which is preferred for execution in a different mode to the current mode of operation of the processor 4. When such a program instruction preferred for execution in a different mode is detected, then processing proceeds to step 50 where an update is made to a preferred metric value. This preferred metric value may, for example, track the mean rate of detection of such program instructions which are executing in their non-preferred mode. Other forms of metric value are also possible. At step 52 a determination is made as to whether or not the updated preferred metric value is above a switching threshold. If the preferred metric value is above the switching threshold, then step 54 initiates a mode switch. The mode switch may be either from the first mode to the second mode when the processor 4 is currently operating in the first mode or from the second mode to the first mode when the processor 4 is currently operating in the second mode. The threshold values for the different switching directions may be different, and indeed, the preferred metric used for heuristically controlling switching in the different directions may also be different.

Figure 7:
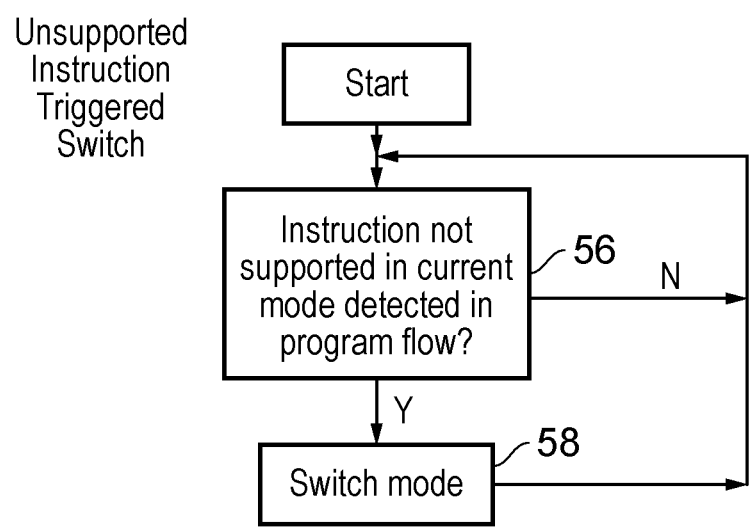
FIG. 7 is a flow diagram schematically illustrating switching between modes triggered by an unsupported instruction.

FIG. 7 schematically illustrates mode switching triggered by detection of an unsupported instruction. At step 56 processing waits until an instruction which is not supported in the current mode of operation is detected by the decoder circuitry 12, 14. An example of such an unsupported instruction is a floating point program instruction detected when the processor 4 is operating in the first mode of operation. When such an unsupported instruction is detected, then step 58 serves to switch the mode of operation, e.g. switch from the first mode of operation which the floating point pipeline 24 is inactive to the second mode of operation in which the floating point pipeline 24 is active.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data, comprising:
   a processor to perform processing operations upon operands stored within a register file of said processor and as specified by program instructions of an instruction set, said processor comprising fetch circuitry for fetching said program instructions for execution from a memory and decoder circuitry, coupled to said fetch circuitry, for decoding said fetched program instructions, and operating in at least a first mode of operation using a first set of active processing circuitry to perform processing operations upon the operands stored within the register file and as specified by the program instructions of the instruction set and a second mode of operation using a second set of active processing circuitry to perform alternative implementations of the processing operations upon the operands stored within the register file and as specified by the program instructions of the instruction set, said second set of active processing circuitry different from said first set of active processing circuitry; wherein, when fetching said program instructions and decoding said fetched program instructions:

said processor is configured to process a first proper subset of 16/32-bit program instructions within said instruction set by operating in a selectable one of said first mode and said second mode; and said processor is configured to process a second proper subset of 32/64-bit program instructions within said instruction set by operating in said second mode, wherein in the first mode said 16/32-bit program instructions of the first proper subset are 16-bit and in the second mode said 32/64-bit program instructions of the second proper subset are 32-bit, or said 16/32-bit program instructions of the first proper subset are 32-bit and said 32/64-bit program instructions of the second proper subset are 64-bit, and wherein said second set of active processing circuitry comprises first decoder circuitry to decode said 16/32-bit program instructions of said first proper subset and second decoder circuitry to decode said 32/64-bit program instructions of said second proper subset and said first set of active processing circuitry comprises said first decoder circuitry and excludes said second decoder circuitry.

2. Apparatus as claimed in claim 1, wherein said first set of active processing circuitry have at least one performance characteristic different from said second set of active processing circuitry.

3. Apparatus as claimed in claim 2, wherein said at least one performance characteristic comprises one or more of:
average energy consumed per instruction to process program instructions;
average time taken per instruction to process program instructions; and
leakage power.

4. Apparatus as claimed in claim 1, wherein said first proper subset comprises N-bit program instructions, said second proper subset comprises M-bit program instructions, M is greater than N.

5. Apparatus as claimed in claim 4, wherein said first set of active processing circuitry comprises first fetch circuitry to fetch program instructions from memory using a first fetch rate fetching on average a first number of bits per cycle, and said second set of active processing circuitry comprises second fetch circuitry to fetch program instructions from memory at a second fetch rate fetching on average a second number of bits per cycle, said second fetch rate being greater than said first fetch rate.

6. Apparatus as claimed in claim 5, wherein a first fetch bit width is N bits and a second fetch bit width is M bits.

7. Apparatus as claimed in claim 5, wherein said first fetch circuitry comprises a first instruction fetch buffer, said second fetch circuitry comprises a second instruction fetch buffer, and said first instruction fetch buffer has a lower instruction storage capacity than said second instruction fetch buffer.

8. Apparatus as claimed in claim 1, wherein said first proper subset excludes floating point program instructions and said second proper subset includes floating point instructions.

9. Apparatus as claimed in claim 8, wherein said second set of active processing circuitry includes floating point processing circuitry and said first set of active processing circuitry excludes said floating point processing circuitry.

10. Apparatus as claimed in claim 9, wherein said floating point processing circuitry is in a low power state in said first mode and a high power state in said second mode.

11. Apparatus as claimed in claim 1, wherein said second decoder circuitry is in a low power state in said first mode and a high power state in said second mode.

12. Apparatus as claimed in claim 1, wherein said second set of active processing circuitry comprises low order register file circuitry configured to store low order operand values and high order register file circuitry configured to store high order operand values and said first set of active processing circuitry comprises said low order register file circuitry and excludes said high order register file circuitry.

13. Apparatus as claimed in claim 12, wherein said high order register file circuitry is gated to an inactive in said first mode and an active state in said second mode.

14. Apparatus as claimed in claim 1, wherein said instruction set includes one or more program instructions to switch between said first mode and said second mode.

15. Apparatus as claimed in claim 1, comprising interrupt control circuitry to control interrupt processing by one or more interrupt handling programs, wherein respective mode flag indicate whether an interrupt handling program is processed in said first mode or said second mode.

16. Apparatus as claimed claim 1, comprising mode control circuitry heuristically to control switching between said first mode and said second mode in dependence upon detected characteristics of a stream of program instructions executed.

17. Apparatus as claimed in claim 1, wherein, when operating in said first mode and an instruction within said second proper subset is detected within program flow to be executed, a switch to said second mode is triggered.

18. Apparatus as claimed in claim 1, wherein, when operating in said first mode and more than a threshold number of instructions preferred for execution in said second mode are detected within program flow to be executed, a switch to said second mode is triggered.

19. Apparatus for processing data, comprising:
processing means for performing processing operations upon operands stored within a register file of said processor means, comprising means for fetching said program instructions for execution from a memory and means for decoding, coupled to said means for fetching, for decoding said fetched program instructions, and as specified by program instructions of an instruction set, said processing means operating in at least a first mode of operation using a first set of active processing means for performing processing operations upon the operands stored within the register file and as specified by the program instructions of the instruction set and a second mode of operation using a second set of active processing means for performing alternative implementations of the processing operations upon the operands stored within the register file and as specified by the program instructions of the instruction set, said second set of active processing means different from said first set of active processing means; wherein, when fetching said program instructions and decoding said fetched program instructions:

said processing means is configured to process a first proper subset of 16/32-bit program instructions within said instruction set by operating in a selectable one of said first mode and said second mode; and said processing means is configured to process a second proper subset of 32/64-bit program instructions within said instruction set by operating in said second mode, wherein in the first mode said 16/32-bit program instructions of the first proper subset are 16-bit and in the second mode said 32/64-bit program instructions of the second proper subset are 32-bit, or said 16/32-bit program instructions of the first proper subset are 32-bit and said 32/64-bit program instructions of the second proper subset are 64-bit, and wherein said second set of active processing means comprises first decoder means to decode said 16/32-bit program instructions of said first proper subset and second decoder means to decode said 32/64-bit program instructions of said second proper subset and said first set of active processing means comprises said first decoder means and excludes said second decoder means.

20. A method of processing data, comprising:

performing processing operations upon operands stored within a register file of a processor, comprising fetch circuitry for fetching said program instructions for execution from a memory and decoder circuitry, coupled to said fetch circuitry, for decoding said fetched program instructions, and as specified by program instructions of an instruction set using at least a first mode of operation using a first set of active processing circuitry for performing processing operations upon the operands stored within the register file and as specified by the program instructions of the instruction set and a second mode of operation using a second set of active processing circuitry for performing alternative implementations of the processing operations upon the operands stored within the register file and as specified by the program instructions of the instruction set, said second set of active processing circuitry different from said first set of active processing circuitry; wherein, when fetching said program instructions and decoding said fetched program instructions:

processing with said processor a first proper subset of 16/32-bit program instructions within said instruction set using a selectable one of said first mode and said second mode; and processing with said processor a second proper subset of 32/64-bit program instructions within said instruction set using said second mode, wherein in the first mode said 16/32-bit program instructions of the first proper subset are 16-bit and in the second mode said 32/64-bit program instructions of the second proper subset are 32-bit, or said 16/32-bit program instructions of the first proper subset are 32-bit and said 32/64-bit program instructions of the second proper subset are 64-bit, and wherein said second set of active processing circuitry comprises first decoder circuitry to decode said 16/32-bit program instructions of said first proper subset and second decoder circuitry to decode said 32/64-bit program instructions of said second proper subset and said first set of active processing circuitry comprises said first decoder circuitry and excludes said second decoder circuitry.

* * * * *